US011235460B2

(12) United States Patent
Carlberg et al.

(10) Patent No.: US 11,235,460 B2
(45) Date of Patent: Feb. 1, 2022

(54) TECHNIQUES AND ARCHITECTURES FOR MANAGING HETEROGENEOUS ROBOTS TO MANAGE DELIVERIES

(71) Applicant: salesforce.com, inc., San Francisco, CA (US)

(72) Inventors: Reid Carlberg, Evergreen, CO (US); Heather Dykstra, Denver, CO (US); Philippe Ozil, Saint Ismier (FR); Alan Dawkuan Hwang, San Francisco, CA (US); Cody Henshaw, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/264,489

(22) Filed: Jan. 31, 2019

(65) Prior Publication Data
US 2020/0094402 A1 Mar. 26, 2020

Related U.S. Application Data

(60) Provisional application No. 62/735,740, filed on Sep. 24, 2018.

(51) Int. Cl.
*B25J 9/16* (2006.01)
*G06Q 50/28* (2012.01)
*G06N 5/02* (2006.01)

(52) U.S. Cl.
CPC ............ *B25J 9/163* (2013.01); *B25J 9/1679* (2013.01); *G06N 5/02* (2013.01); *G06Q 50/28* (2013.01)

(58) Field of Classification Search
CPC .......... B25J 9/163; B25J 9/1679; G06Q 50/28
USPC ................................................. 700/245–264
See application file for complete search history.

(56) References Cited

U.S. PATENT DOCUMENTS

| 5,577,188 | A | | 11/1996 | Zhu |
| 5,608,872 | A | | 3/1997 | Schwartz et al. |
| 5,649,104 | A | | 7/1997 | Carleton et al. |
| 5,715,450 | A | | 2/1998 | Ambrose et al. |
| 5,761,419 | A | | 6/1998 | Schwartz et al. |
| 5,819,038 | A | | 10/1998 | Carleton et al. |
| 5,821,937 | A | | 10/1998 | Tonelli et al. |
| 5,825,981 | A | * | 10/1998 | Matsuda .......... G05B 19/41815 700/248 |
| 5,831,610 | A | | 11/1998 | Tonelli et al. |
| 5,873,096 | A | | 2/1999 | Lim et al. |

(Continued)

*Primary Examiner* — Timothy R Waggoner
(74) *Attorney, Agent, or Firm* — Kwan & Olynick LLP

(57) ABSTRACT

Architectures and techniques to control heterogeneous teams of robots. Input is received from a remote device with a control platform. The control platform provides a control mechanism for a team of heterogenous robots having at least two different control structures. Control signals are generated for at least two different types of robots communicatively coupled with the control platform. A first type of robot is independent of a second type of robot and the first and second type of robot have different control mechanisms. The first type of robot receives a request for an item to be delivered. At least one of the first type of robot operates to identify the item and to move the item to an intermediate location and to generate a request to at least one of the second type of robot. At least one of the second type of robot operates to move the item from the intermediate location to a new location.

20 Claims, 7 Drawing Sheets

(56) References Cited

U.S. PATENT DOCUMENTS

| | | | |
|---|---|---|---|
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,904,335 B2 * | 6/2005 | Solomon | F41H 13/00 318/568.11 |
| 7,289,976 B2 | 10/2007 | Kihneman et al. | |
| 7,340,411 B2 | 3/2008 | Cook | |
| 7,620,655 B2 | 11/2009 | Larsson et al. | |
| 8,489,229 B2 * | 7/2013 | Kuehnemann | G06Q 10/08 700/217 |
| 9,486,921 B1 * | 11/2016 | Straszheim | B25J 9/1679 |
| 9,682,481 B2 * | 6/2017 | Lutz | B25J 9/1697 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249497 A1 * | 12/2004 | Saigh | E04H 14/00 700/216 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0177744 A1 | 7/2009 | Marlow et al. | |
| 2013/0245823 A1 * | 9/2013 | Kimura | B25J 5/02 700/248 |
| 2015/0134110 A1 * | 5/2015 | Koyanagi | B25J 9/0084 700/248 |
| 2015/0197009 A1 * | 7/2015 | Melikian | B25J 9/1669 700/259 |
| 2015/0352721 A1 * | 12/2015 | Wicks | B25J 9/1664 700/228 |
| 2016/0121482 A1 * | 5/2016 | Bostick | G05D 1/0016 700/257 |
| 2016/0129592 A1 * | 5/2016 | Saboo | B25J 9/1661 700/248 |
| 2016/0167231 A1 * | 6/2016 | Nakayama | B25J 9/1676 700/255 |
| 2018/0001470 A1 * | 1/2018 | Rusu | G06N 5/022 |
| 2018/0239343 A1 * | 8/2018 | Voorhies | G05B 19/41895 |
| 2020/0262063 A1 * | 8/2020 | Perera | B25J 9/1661 |

\* cited by examiner

TECHNIQUES AND ARCHITECTURES FOR MANAGING HETEROGENEOUS ROBOTS TO MANAGE DELIVERIES

RELATED APPLICATIONS

This application claims priority under 35 U.S.C. § 119(e) to U.S. Provisional Application Ser. No. 62/735,740, entitled "TECHNIQUES AND ARCHITECTURES FOR MANAGING HETEROGENOUS ROBOTS TO MANAGE DELIVERIES," filed on Sep. 24, 2018, which is herein incorporated by reference in its entirety.

TECHNICAL FIELD

Embodiments relate to techniques for managing teams of heterogenous robots. More particularly, embodiments relate to techniques for managing heterogenous robots to perform deliveries.

BACKGROUND

Organizing and managing deliveries can be labor-intensive and expensive as well as complex to perform well. Various techniques and mechanisms have been developed to address this; however, many utilize proprietary technology or other barriers to simple and efficient utilizations. Thus, improved efficiencies in deliveries can be valuable.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
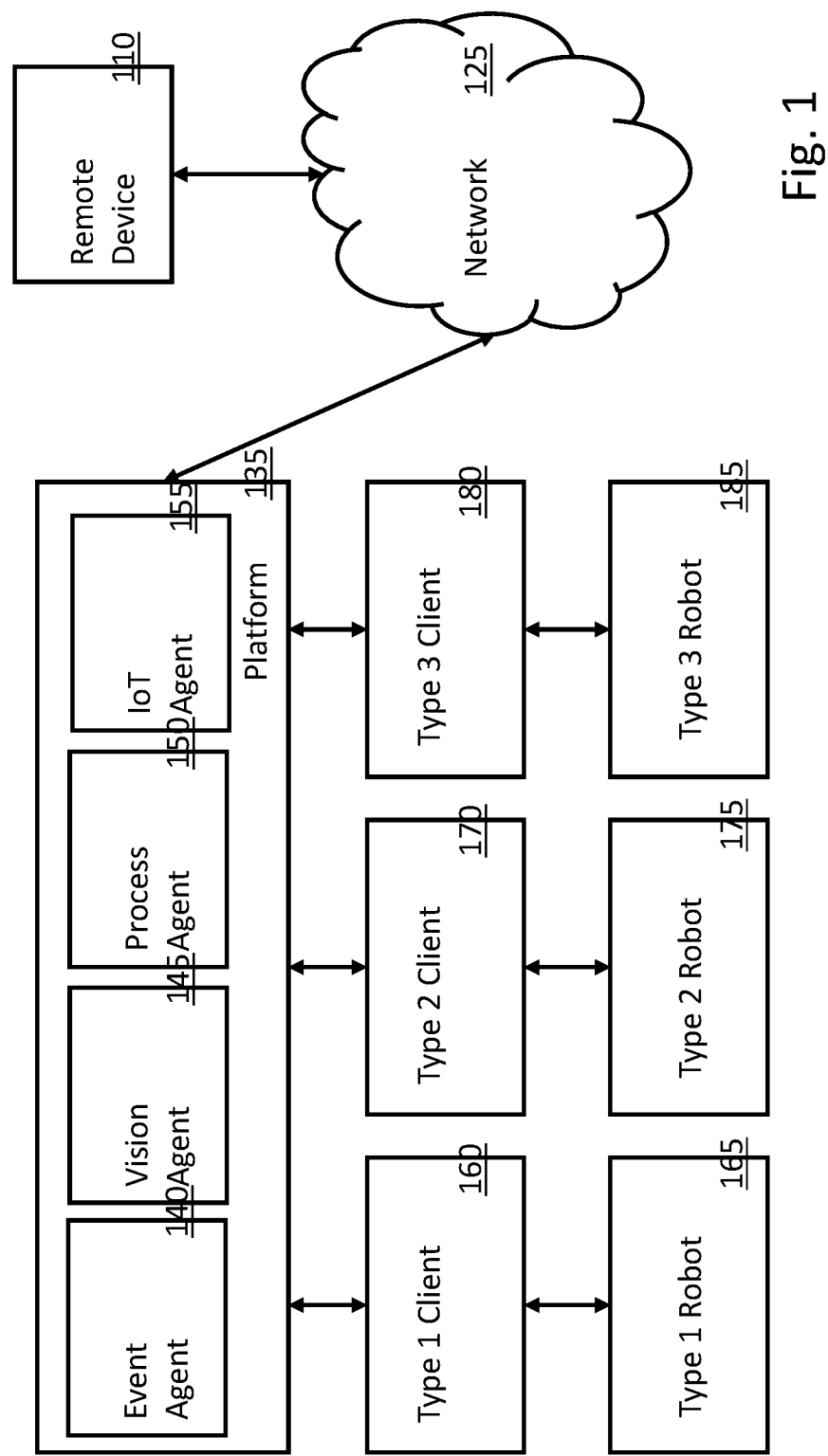
FIG. 1 is a block diagram of one embodiment of an architecture for utilizing teams of heterogeneous robots.

In the following description, numerous specific details are set forth. However, embodiments of the invention may be practiced without these specific details. In other instances, well-known structures and techniques have not been shown in detail in order not to obscure the understanding of this description.

Described herein are techniques to coordinate and manage a team (e.g., five, eight, fourteen) heterogenous robots to fulfill one or more requests (e.g., supply chain delivery). In alternate embodiments, a different number of robots can be utilized and the team of robots can be utilized for other types of operations/requests. In various embodiments, the team of robots can be controlled by a mobile device (e.g., smart phone, wearable computing device, tablet); however, in other embodiments, other types of devices (e.g., laptop, kiosk, desktop). In one embodiment, a user can use the control device to select the payload and the robot management system handles the rest of the delivery process.

Thus, in various embodiments, the techniques and architectures described herein can provide a platform-level architecture that can be customized/updated at the platform level. This streamlines the process and eliminates the need to program at the individual robot level using proprietary control/programming languages. In some embodiments, the platform can provide a multitenant environment in which disparate heterogeneous organizations can utilize the functionality described herein.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

As described in greater detail below, platform events can be utilized to provide control of one or more teams of heterogenous robots to accomplish various tasks, for example, fulfilling supply chain requests. The examples below are generally in terms of three types of robots working to accomplish supply chain tasks; however, any number and type of robots can be utilized to accomplish various tasks.

In one embodiment, the management system starts with a platform event requesting a particular item. In one embodiment, robots monitor requests and analyze available inventor using object detection capability to determine if the item is available. If the item is available, the robot delivers the item to the next stage and triggers another event to tell the system that it is able to fill the request.

In one embodiment, the next stage of robots monitor for events triggered by robots in the first phase/level/zone/stage of the delivery system. Triggering of the event causes one or more robots from the next stage to proceed with its action. In various embodiments, the first robot that started the process by picking up the selected item and the second robot that will handle the second phase of the process are not physically connected to each other and are not "aware" of each other. This type of chaining can continue as needed for any supply chain scenario or robot deployment.

In one embodiment, once the final robot receives the payload, it can analyze the item to determine if it matches the original request. If it does, the payload can be moved to a success area. In one embodiment, if the payload does not match the original request, the final robot can dispose of the original item and create a case so that a human can handle the request. In one embodiment one or more robots can utilize robotic vision functionality.

FIG. 1 is a block diagram of one embodiment of an architecture for utilizing teams of heterogeneous robots. In the example of FIG. 1, three types of robots (e.g., Arm, Linear, YuMi) are specified; however, any number of different types of robots can be utilized in a similar manner.

In various embodiments, one or more remote devices (e.g., remote device 110) can be communicatively coupled with platform 135 via network 125. Any number of remote devices can be supported. Remote device 125 can be any type of computing device, for example, a desktop computer, a tablet, a wearable computing device, a smartphone, etc. Network 125 can be any type of network to connection multiple electronic devices.

In one embodiment, platform 135 is part of a multitenant environment. Various embodiments of multitenant environments are described in greater detail below.

In various embodiments, platform 135 can include one or more of event agent 140, vision agent 145, process agent 150 and/or Internet of Things (IoT) agent 155. In various embodiments, the agents within platform 135 provide an interface and structure between the remote device and the team(s) of robots to allow the tasks specified without the need for programming and controlling of individual robot types for each task (or group of tasks).

In various embodiments, event agent 140 functions to detect, monitor, process and/or handle platform events. Some or all of those events can be related to the team(s) of robots. In some embodiments, event agent 140 can include artificial intelligence functionality. In various embodiments, vision agent 145 functions to support computer/robot vision functionality that can be used to control and/or receive feedback from the team(s) of robots. In some embodiments, vision agent 145 can include artificial intelligence functionality.

In various embodiments, process agent 150 functions to manage, generate, validate and/or handle processes on platform 135. Some or all of the processes can be related to the team(s) of robots. In some embodiments, process agent 145 can include artificial intelligence functionality. The Internet of Things generally refers to networks of devices beyond standard computing devices, for example, home appliances, automobiles, medical devices, etc. In various embodiments, IoT agent 155 provides an interface between platform 135 and IoT devices. This can allow IoT devices to send and/or receive commands, requests, etc. to and from platform 135 to utilize the functionality provided by the team(s) of robots.

The example of FIG. 1 includes three types of robots and corresponding client entities; however, any number of robot types and client entities can be supported. For example, in one embodiment, Type 1 client 160 can be an ARM client and Type 1 robot 165 can be an ARM robot, Type 2 client 170 can be a linear robot client and Type 2 2 robot 175 can be a linear robot, and Type 3 client 180 can be a YuMi client and Type 3 robot 185 can be a YuMi robot. In alternate embodiments, other robot types and client types can be supported.

Figure 2:
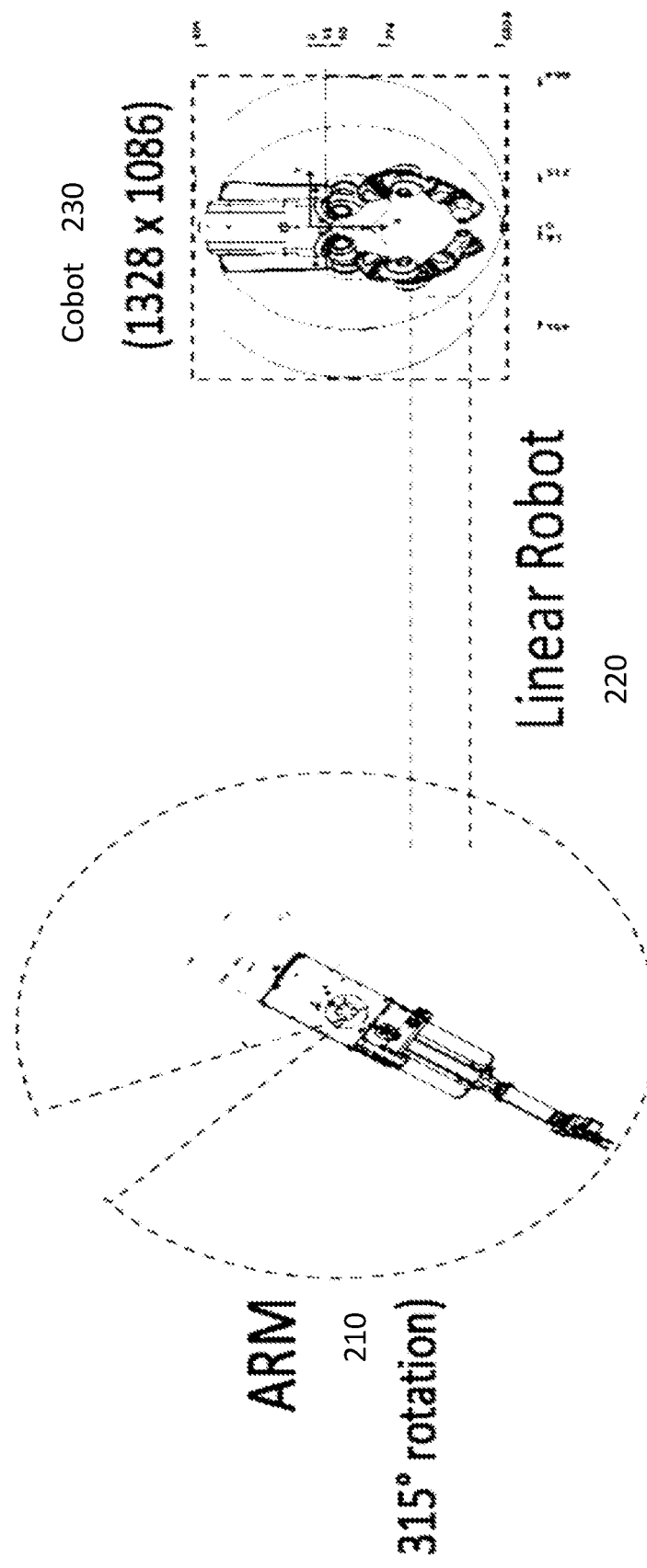
FIG. 2 is an example layout of a team of three robots.

FIG. 2 is an example layout of a team of three robots. The robots can each have corresponding ranges of motion and capabilities. The specifics in FIG. 2 are simple examples and not intended to limit the supported functionality. As described in greater detail below, ARM robot 210 can function to find and/or move a requested object from within its field of rotation to linear robot 220, which can transport the object to YuMi robot 230 for further processing.

Continuing with the specific example from FIG. 1, Type 1 robot 165 can be any type of arm robot (e.g., 210) that can operate to move objects of the desired size. In one embodiment, for example, a robotic arm (e.g., Modular ARM or ARM Long Reach Heavy Lift) available from GearWurx of Nibley, Utah can be utilized. In some embodiments, additional functionality can be added to the arm robot, for example, a small computing device (e.g., Raspberry Pi) and/or a digital camera can be used to extend the functionality of the robotic arm.

In one embodiment, Type 1 client 160 can interpret events and/or other information from platform 135 to control Type 1 robot 165. In one embodiment, Type 1 client 160 receives platform events from platform 135 and translates the events into pulse width modulation (PWM) control signals that are used to control Type 1 robot 165. In other embodiments, other control mechanisms can be supported.

In various embodiments, Type 2 robot 175 can be any type of linear (or single axis) robot (e.g., 220) that can operate to move objects along a linear path. In some embodiments, additional functionality can be added to the linear robot, for example, a small computing device (e.g., Raspberry Pi) and/or a digital camera can be used to extend the functionality of the linear robot.

In one embodiment, Type 2 client 170 can interpret events and/or other information from platform 135 to control Type 2 robot 175. In one embodiment, Type 2 client 170 receives platform events from platform 135 and translates the events into PWM signals that are used to control Type 2 robot 175. In other embodiments, other control mechanisms can be supported.

In various embodiments, Type 3 robot 185 can be any type of collaborative robot, or cobot, (e.g., 230) that can operate to manipulate the objects in a collaborative matter based on, for example, event information from platform 135. In general, cobots are machines designed to help humans and robots work together with extensive safety designs built in so they can work safely in the same space as humans. An example collaborative robot it the YuMi robot available from ABB of Auburn Hills, Mich. In some embodiments, Type 3 robot 185 is a dual-arm robot that can operate in four or more axes. In various embodiments, Type 3 robot 185 can have two or more small computing devices (e.g., Raspberry Pi) and/or digital cameras.

In one embodiment, Type 3 client 180 can interpret events and/or other information from platform 135 to control Type 3 robot 185. In one embodiment, Type 2 client 170 receives platform events from platform 135 and translates the events into proprietary control signals that are used to control Type 2 robot 175. These proprietary control signals are generated by a proprietary cobot control client. In other embodiments, other control mechanisms can be supported.

Teams of robots can be used, for example, to manage a supply chain. In some embodiments, one or more arm robots can locate and pick up a selected item, and move the selected item to one or more linear robots. The linear robot(s) can move the item to one or more cobots for inspection and final processing. In various embodiments, the team(s) of robots can be managed by a platform architecture, for example, the Salesforce Lighting Platform available from salesforce.com of San Francisco, Calif.

In some embodiments, a control panel app (or other user interface) can be provided via remote device 110, which is configured to communicate with platform 135 through network 125. In various embodiments, arm robots can be controlled using one or more of event agent 140 (e.g., utilizing salesforce platform events), process agent 150 (e.g., utilizing salesforce Einstein platform services) and/or IoT agent 155 (e.g., utilizing salesforce IoT explorer).

In this example, platform events can be used to track system state in IoT agent 155, and platform events can be used to issue commands to one or more of the robots. In one embodiment, when one or more platform events indicate that a robot should acquire a payload, artificial intelligence (AI) and/or computer vision functionality (e.g., salesforce Einstein Object Detection) can be used to determine the location of the specified object.

Continuing in this example, linear robots can be controlled using platform events and IoT agent 155. Cobots can be controlled using platform events, AI and/or computer vision. Other control configurations can also be supported.

As an example process flow, a user of remote device 110 can request pickup of a specified item. The arm robot (with additional processing capability and camera) can position itself with respect to a target item, take a picture of the item and upload the picture to platform 135. The picture upload can trigger a process that utilizes object detection functionality to analyze the pictured object. In one embodiment, mobile device 110 can display the picture and/or AI or object detection analysis can be applied to the picture.

If the item is the correct object, the arm robot can pick up the item and place it on a linear robot. In some alternate embodiments, the linear robot can have additional processing capability and a camera to track and/or analyze the item. The item can be delivered to the cobot, which can take one or more pictures to be uploaded to platform 135 for further analysis, which can include, for example, further vision and/or AI analysis. If the item is determined to be the correct item, the cobot can finalize processing or work with one or more other robots/cobots to complete processing.

This process can be applied, for example, to medication (or the handling of other expensive, regulated or hazardous items). In some embodiments, some or all of the actions, movements, decisions can be stored in a blockchain (or similar structure) to be visible to manufacturers, owners, service providers, delivery agents, etc. Blockchain generally refers to a growing list of records (or blocks) that are cryptographically linked with each block having a cryptographic hash of the previous block, a timestamp, and transaction data. With an open, distributed ledger of blocks, transactions/activity can be verified and permanently maintained.

One benefit of blockchain utilization in the examples above is that by maintaining an unmodifiable log of time-stamped actions that are related to delivery of payloads/items, a delivery ledger that cannot be tampered with can be maintained. Similar uses of blockchain technology can be applied to other actions.

Figure 3:
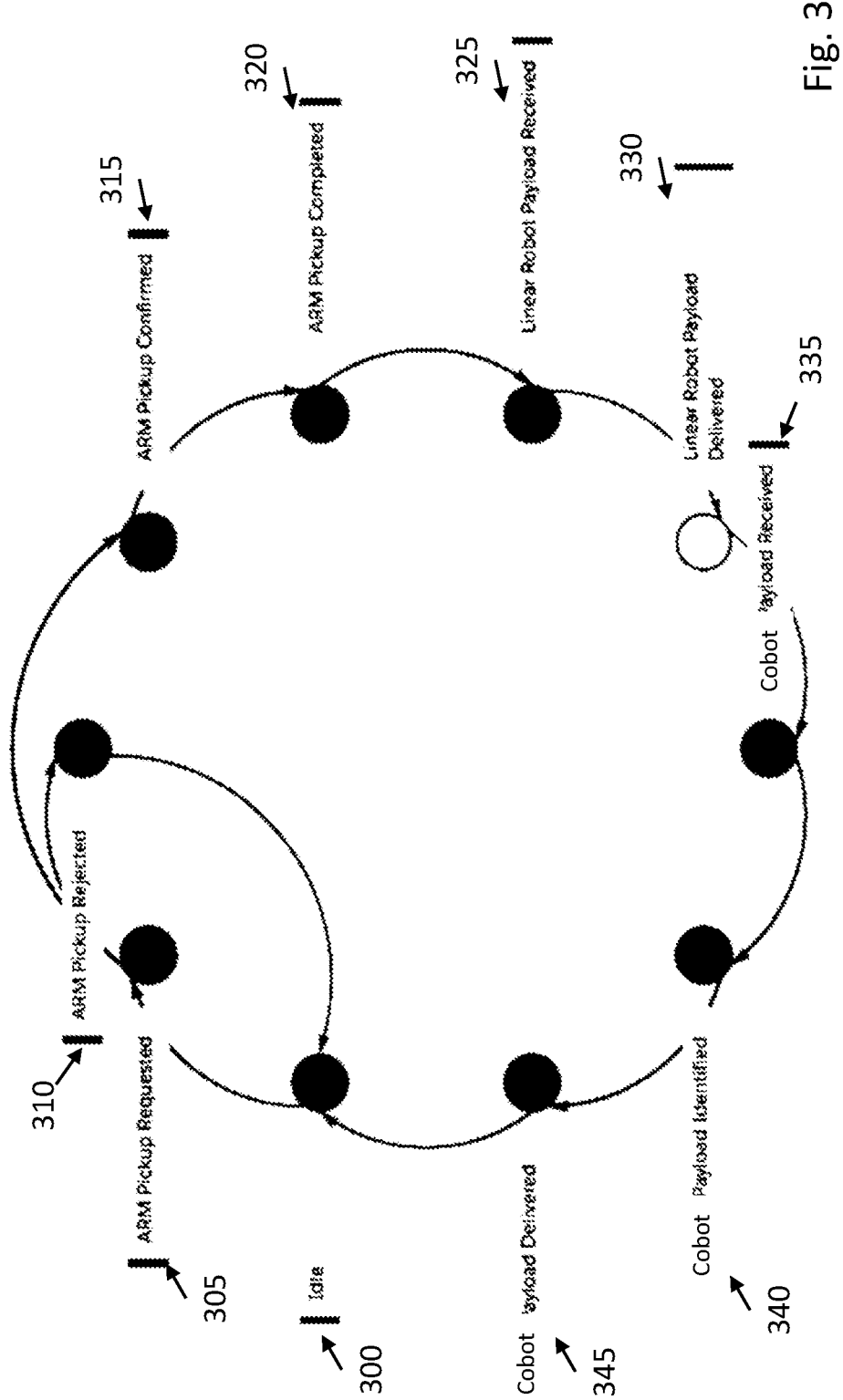
FIG. 3 is an example state diagram for managing a team of robots.

FIG. 3 is an example state diagram for managing a team of robots. The state diagram of FIG. 3 follows the examples above; however, modifications can be made for additional and/or different types of robots and robot team sizes. The process can start in idle state 300.

In response to a pickup request, state 305 can be utilized to analyze the request the request. The pickup request can be rejected 310 or confirmed 315. If the pickup request is confirmed 315 the pickup can be initiated and processed as described above. When the pickup is completed 320 the payload can be passed to the linear robot 325. The linear robot delivers the payload 330 to the cobot 335. The cobot can identify the payload 340 and perform any requested processing before delivering the payload 345. The platform and/or robot team can then return to idle (300).

Figure 4:
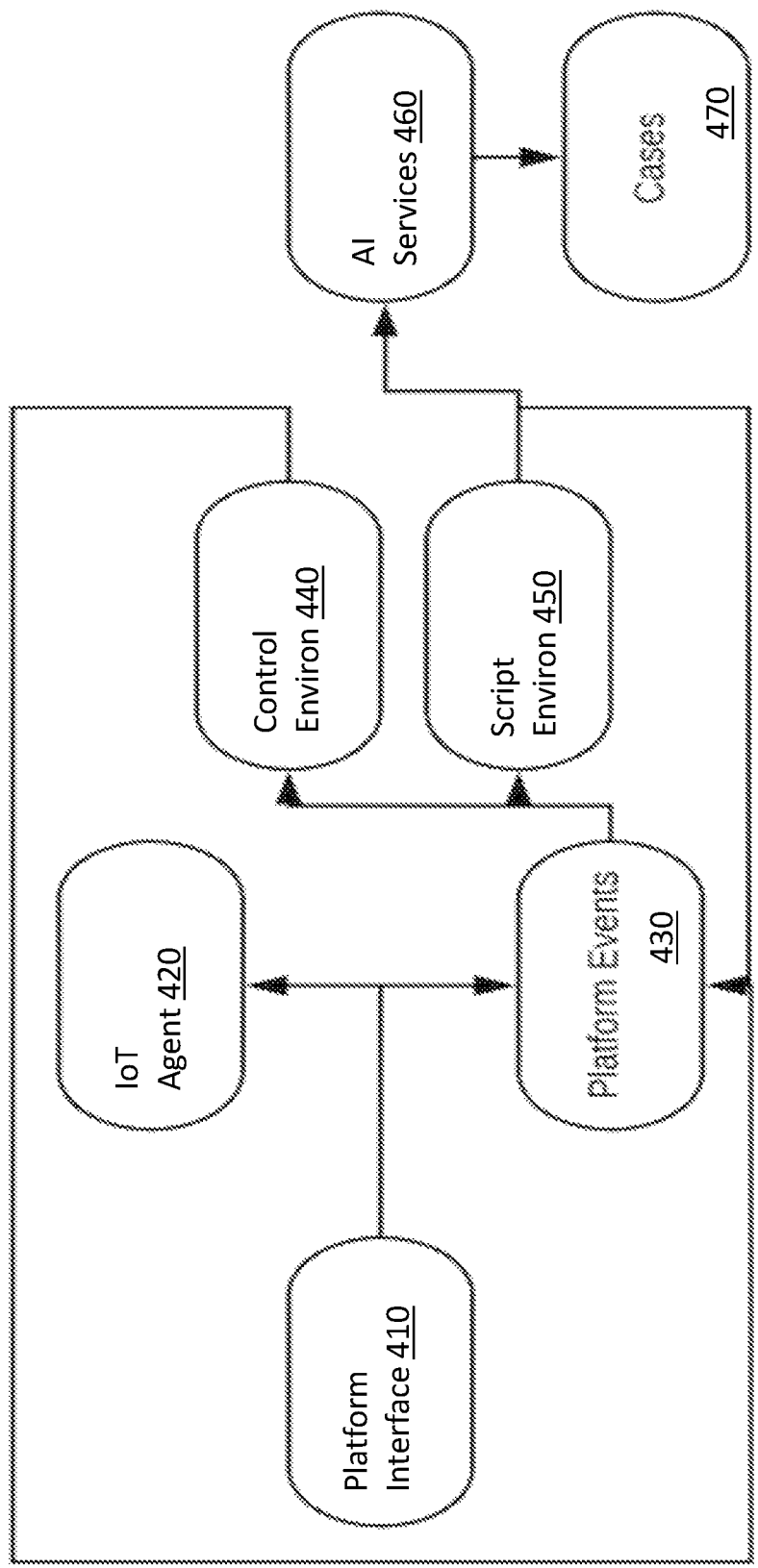
FIG. 4 is an example flow diagram for a platform for managing a team of robots.

FIG. 4 is an example flow diagram for a platform for managing a team of robots. In various embodiments, platform interface 410 (e.g., Salesforce Mobile) provides an interface for any number of remote devices (e.g., 110 in FIG. 1) to access the functionality of the platform (e.g., 135 in FIG. 1). In some embodiments, platform interface can interact with remote devices corresponding to multiple tenants of a multitenant environment (some embodiments of which are described in greater detail below).

Platform interface 410 can receive commands/instructions and/or can generate commands or instructions for IoT agent 420 (e.g., Salesforce IoT Explorer) and/or for utilization of platform events 430. Similarly, IoT agent 420 can receive and/or generate commands or instructions for utilization of platform events 430.

Platform events 430 can be sent to control environment 440 (e.g., Python), which can be used for control of one or more robots in the team of robots, as described above. Similarly, platform events 430 can be sent to script environment 450 (e.g., Nodejs), which can utilize AI services 460 (e.g., Salesforce Einstein Platform Services) and cases 470 to control of one or more robots in the team of robots, as described above.

Figure 5:
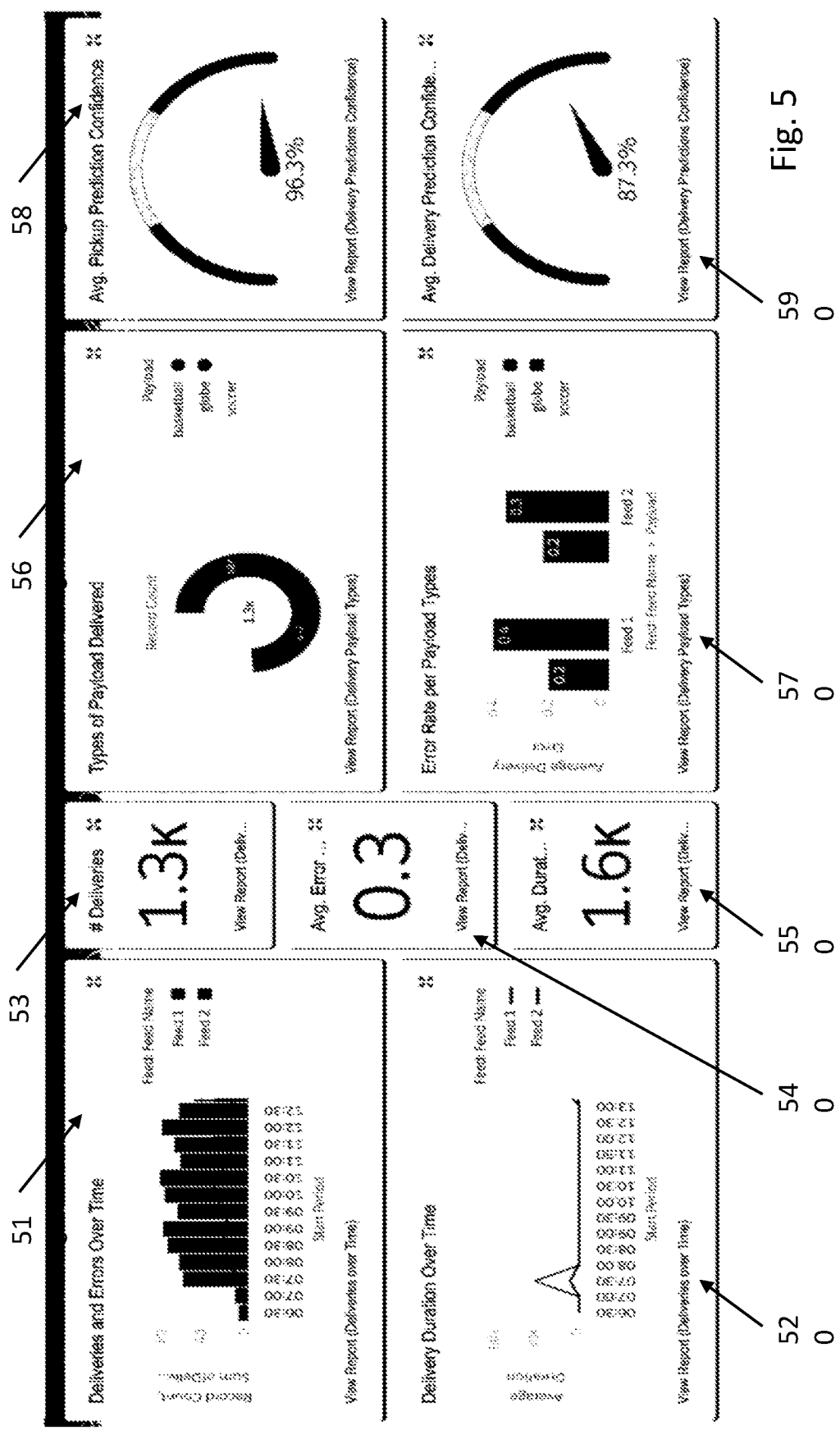
FIG. 5 is an example user interface that can provide analytics for teams of robots.

FIG. 5 is an example user interface that can provide analytics for teams of robots. FIG. 5 provides an example dashboard that can be provided to present various analytics related to operation of the team of robots. In one embodiment, the dashboard can be controlled and presented by the platform. In other embodiments, other components can provide some or all of the dashboard. The example of FIG. 5 is just one simple example. Many other configurations can also be supported.

Example analytics that can be provided include deliveries and errors over time 510, delivery duration over time 520, number of deliveries 530, average error rate 540, average duration 550, types of payload delivered 560, error rate per payload type 570, average pickup prediction confidence 580, average delivery prediction confidence 590.

Figure 6:
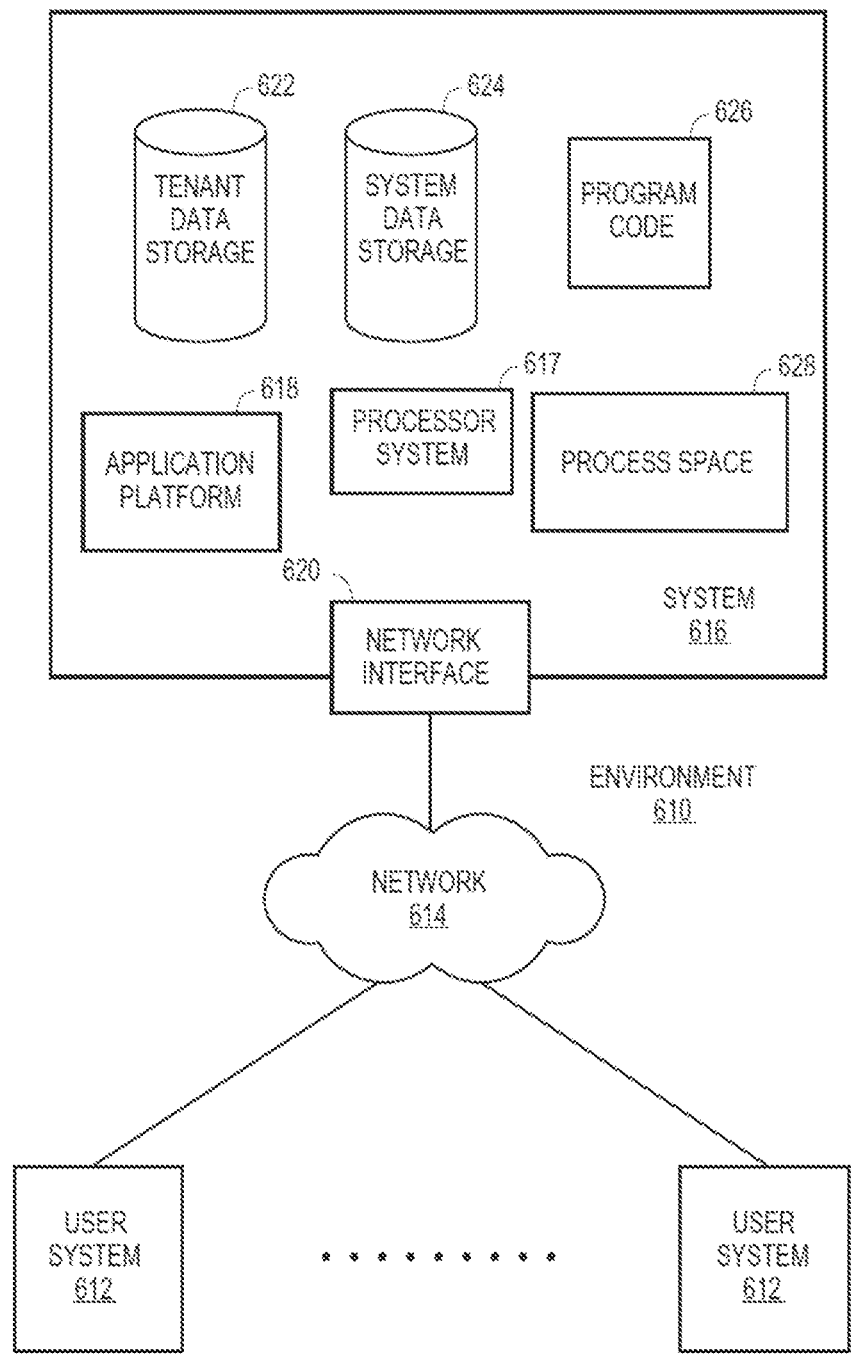
FIG. 6 illustrates a block diagram of an environment where an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core series processor or the like. Similarly, system 616 (and additional instances of an MTS, where more than one is present) and all of their components might be operator configurable using application(s) including computer code to run using a central processing unit such as processor system 617, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
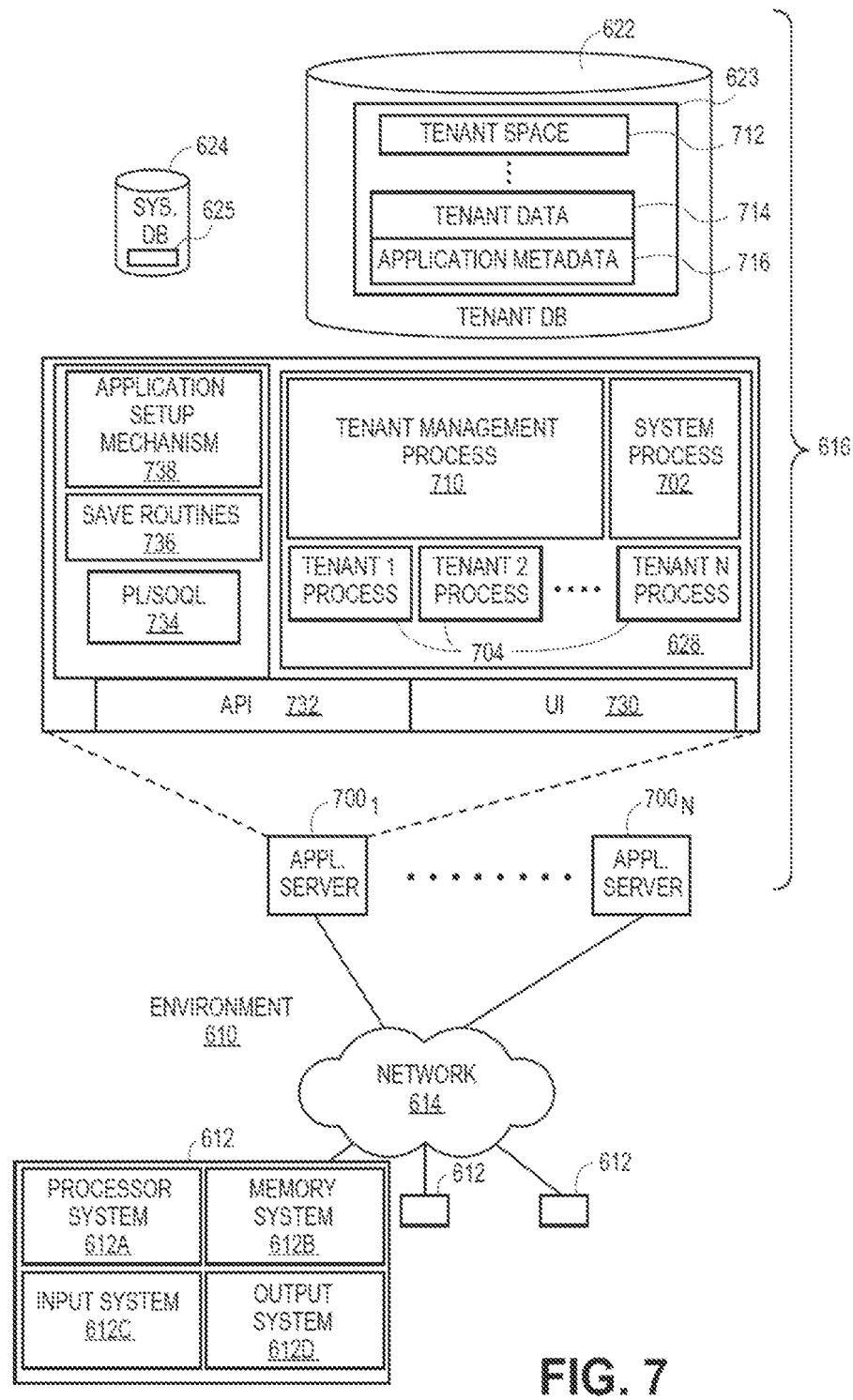
FIG. 7 illustrates a block diagram of an environment where an on-demand database service might be used.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 BIG-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising
a multi-tenant control platform configured to receive input from a remote device from one of a plurality of disparate heterogeneous organizations supported by the multi-tenant control platform, each of the plurality of organizations having at least one corresponding remote device, the control platform to provide a control mechanism for a team of heterogeneous robots shared by at least two organizations having at least two different control structures, wherein the control platform provides users from the multiple disparate heterogeneous organization common access with specific privileges to a software instance of the control platform and provides an interface and structure between the remote devices corresponding to the plurality of organizations and a team of robots to allow tasks specified by the remote device to be performed by the team of heterogeneous robots without programming and controlling individual robot types for corresponding tasks; and at least two different types of robots communicatively coupled with the control platform, wherein a first type of robot is independent of a second type of robot and the first and second type of robot have different control mechanisms, the first type of robot to receive a request for an item to be delivered and at least one of the first type of robot operates to identify the item by at least taking a picture of the item and uploading the picture to the control platform to trigger a process that utilizes artificial intelligence object detection functionality on the control platform to verify the item, to move the item, if verified, to an intermediate location and to generate a request to at least one of the second type of robot, further wherein at least one of the second type of robot operates to move the item from the intermediate location to a new location and provide additional processing capability on the control platform.

2. The system of claim 1, wherein at least one of the first type of robot and the second type of robot utilizes artificial intelligence to accomplish its associated task.

3. The system of claim 1, wherein indications of at least a portion of operations by the first type of robot or the second type of robot are stored in a blockchain structure.

4. The system of claim 1, wherein the first type of robot is an arm robot and the second type of robot comprises a cobot.

5. The system of claim 4, further comprising at least one linear robot.

6. The system of claim 1, wherein the control platform controls operation of the team of heterogeneous robots utilizing generation and processing of platform events.

7. The system of claim 1, wherein the control platform controls operation of the team of heterogeneous robots utilizing artificial intelligence techniques and computer vision data.

8. A method, comprising:

receiving input from a remote device from one of a plurality of disparate heterogeneous organizations supported by a multi-tenant control platform, each of the plurality of organizations having at least one corresponding remote device, the multi-tenant control platform to provide a control mechanism for a team of heterogeneous robots shared by at least two organizations having at least two different control structures, wherein the control platform provides users from the multiple disparate heterogeneous organization common access with specific privileges to a software instance of the control platform and provides an interface and structure between the remote devices corresponding to the plurality of organizations and a team of robots to allow tasks specified by the remote device to be performed by the team of heterogeneous robots without programming and controlling individual robot types for corresponding tasks; and generating control signals for at least two different types of robots communicatively coupled with the control platform, wherein a first type of robot is independent of a second type of robot and the first and second type of robot have different control mechanisms, the first type of robot to receive a request for an item to be delivered and at least one of the first type of robot operates to identify the item by at least taking a picture of the item and uploading the picture to the control platform to trigger a process that utilizes artificial intelligence object detection functionality on the control platform to verify the item, to move the item, if verified, to an intermediate location and to generate a request to at least one of the second type of robot, further wherein at least one of the second type of robot operates to move the item from the intermediate location to a new location and provide additional processing capability on the control platform.

9. The method of claim 8, wherein at least one of the first type of robot and the second type of robot utilizes artificial intelligence to accomplish its associated task.

10. The method of claim 8, wherein indications of at least a portion of operations by the first type of robot or the second type of robot are stored in a blockchain structure.

11. The method of claim 8, wherein the first type of robot is an arm robot and the second type of robot comprises a cobot.

12. The method of claim 11, further comprising at least one linear robot.

13. The method of claim 8, wherein the control platform controls operation of the team of heterogeneous robots utilizing generation and processing of platform events.

14. The method of claim 8, wherein the control platform controls operation of the team of heterogeneous robots utilizing artificial intelligence techniques and computer vision data.

15. A non-transitory computer-readable medium having stored thereon instructions that, when executed by one or more processors, are configurable to cause the one or more processors to:

receive input from a remote device from one of a plurality of disparate heterogeneous organizations supported by a multi-tenant control platform, each of the plurality of organizations having at least one corresponding remote device, the multi-tenant control platform to provide a control mechanism for a team of heterogeneous robots shared by at least two organizations having at least two different control structures, wherein the control platform provides users from the multiple disparate heterogeneous organization common access with specific privileges to a software instance of the control platform and provides an interface and structure between the remote devices corresponding to the plurality of organizations and a team of robots to allow tasks specified by the remote device to be performed by the team of heterogeneous robots without programming and controlling individual robot types for corresponding tasks; and generate control signals for at least two different types of robots communicatively coupled with the control platform, wherein a first type of robot is independent of a second type of robot and the first and second type of robot have different control mechanisms, the first type of robot to receive a request for an item to be delivered and at least one of the first type of robot operates to identify the item by at least taking a picture of the item and uploading the picture to the control platform to trigger a process that utilizes artificial intelligence object detection functionality on the control platform to verify the item, to move the item, if verified, to an intermediate location and to generate a request to at least one of the second type of robot, further wherein at least one of the second type of robot operates to move the item from the intermediate location to a new location and provide additional processing capability on the control platform.

16. The non-transitory computer-readable medium of claim 15, wherein at least one of the first type of robot and the second type of robot utilizes artificial intelligence to accomplish its associated task.

17. The non-transitory computer-readable medium of claim 15, wherein indications of at least a portion of operations by the first type of robot or the second type of robot are stored in a blockchain structure.

18. The non-transitory computer-readable medium of claim 15, wherein the first type of robot is an arm robot and the second type of robot comprises a cobot.

19. The non-transitory computer-readable medium of claim 18, further comprising at least one linear robot.

20. The non-transitory computer-readable medium of claim 15, wherein the control platform controls operation of the team of heterogeneous robots utilizing artificial intelligence techniques and computer vision data.

\* \* \* \* \*